(12) United States Patent
Wong et al.

(10) Patent No.: US 9,406,105 B2
(45) Date of Patent: Aug. 2, 2016

(54) BINOCULAR VISUAL EXPERIENCE ENRICHMENT SYSTEM

(71) Applicant: The Chinese University of Hong Kong, Hong Kong (CN)

(72) Inventors: Tien-Tsin Wong, Hong Kong (CN); Pheng-Ann Heng, Hong Kong (CN); Xuan Yang, Hong Kong (CN); Linling Zhang, Hong Kong (CN)

(73) Assignee: The Chinese University of Hong Kong, Shatin, New Territories, Hong Kong (CN)

( * ) Notice: Subject to any disclaimer, the term of this patent is extended or adjusted under 35 U.S.C. 154(b) by 264 days.

(21) Appl. No.: 13/954,685

(22) Filed: Jul. 30, 2013

(65) Prior Publication Data

US 2014/0055447 A1 Feb. 27, 2014

Related U.S. Application Data

(60) Provisional application No. 61/678,732, filed on Aug. 2, 2012.

(51) Int. Cl.
| | | |
|---|---|---|
| *G06T 5/00* | (2006.01) | |
| *G06T 15/00* | (2011.01) | |
| *H04N 1/00* | (2006.01) | |
| *H04N 1/23* | (2006.01) | |
| *H04N 13/00* | (2006.01) | |

(52) U.S. Cl.
CPC . *G06T 5/00* (2013.01); *G06T 5/009* (2013.01); *G06T 15/00* (2013.01); *H04N 1/00127* (2013.01); *H04N 1/00169* (2013.01); *H04N 1/23* (2013.01); *H04N 13/0007* (2013.01); *H04N 13/0033* (2013.01); *H04N 2213/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0154820 | A1* | 10/2002 | Kaneko | G06T 7/20 382/209 |
| 2006/0158730 | A1* | 7/2006 | Kira | G02B 27/2228 359/462 |
| 2008/0192819 | A1* | 8/2008 | Ward et al. | 375/240.02 |
| 2008/0252718 | A1* | 10/2008 | Provitola | G02B 27/2221 348/42 |
| 2009/0096983 | A1* | 4/2009 | Provitola | G02C 7/16 351/158 |
| 2012/0092456 | A1* | 4/2012 | Akiba | H04N 13/0022 348/46 |
| 2012/0183210 | A1* | 7/2012 | Zheng et al. | 382/162 |
| 2012/0269275 | A1* | 10/2012 | Hannuksela | H04N 13/0048 375/240.25 |
| 2012/0308115 | A1* | 12/2012 | Sun | H04N 13/026 382/154 |
| 2013/0208014 | A1* | 8/2013 | Fleck et al. | 345/672 |

OTHER PUBLICATIONS

Huang C-B, Zhou J, Zhou Y, Lu Z-L, "Contrast and Phase Combination in Binocular Vision", PLoS ONE, vol. 5, issue 12, Dec. 2010, e15075, doi:10.1371/journal.pone.0015075.*

* cited by examiner

*Primary Examiner* — James A Thompson
(74) *Attorney, Agent, or Firm* — Kilpatrick Townsend & Stockton LLP; Kenneth R. Allen

(57) ABSTRACT

In a computer-based graphics imaging system, binocular tone mapping is employed with an optimization-based framework to generate a binocular single vision image with more visual richness than a single tone-mapped image, the binocular tone mapping being guided by a binocular viewing comfort predictor (BVCP) metric in order to assure stable formation of binocularly tone-mapped image pairs, so that visual information content of the image pair can be maximized without triggering visual discomfort.

20 Claims, 13 Drawing Sheets
(13 of 13 Drawing Sheet(s) Filed in Color)

Left view   Right view

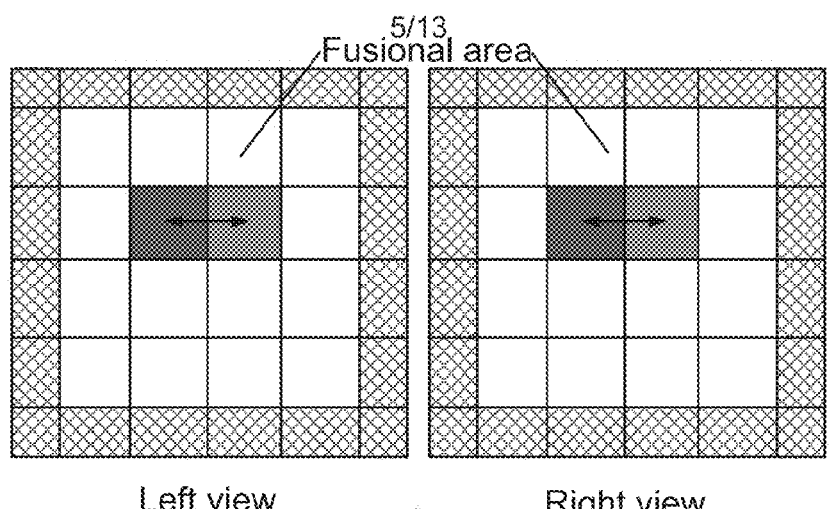
Left view  FIG. 9  Right view
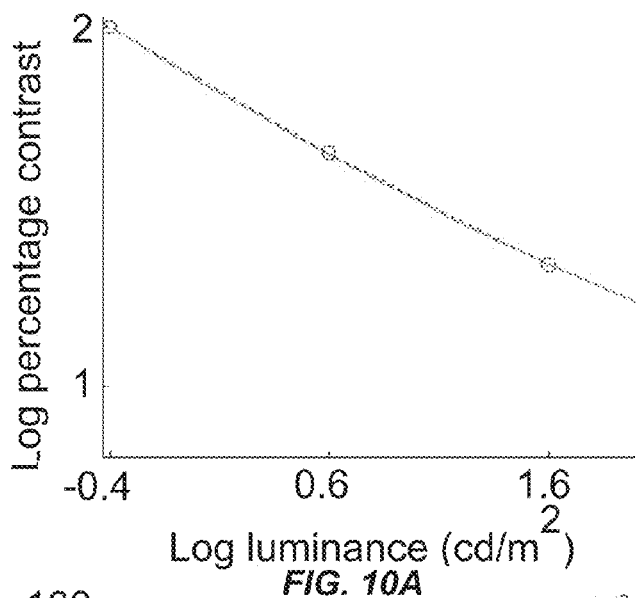
FIG. 10A
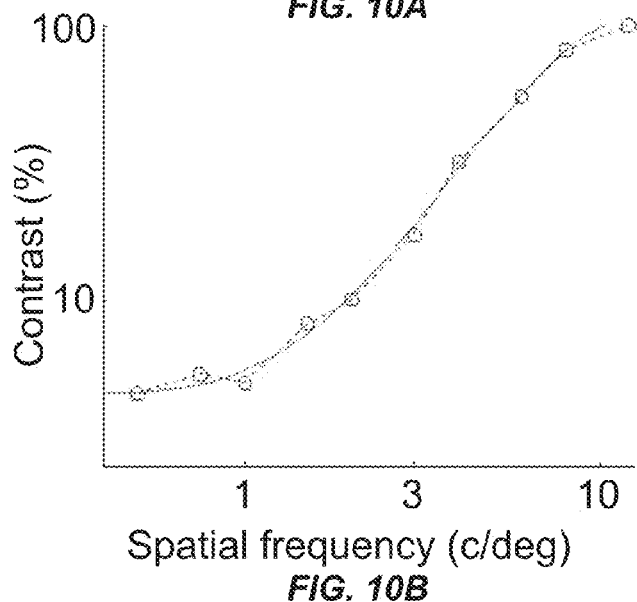
FIG. 10B BVCP assessment

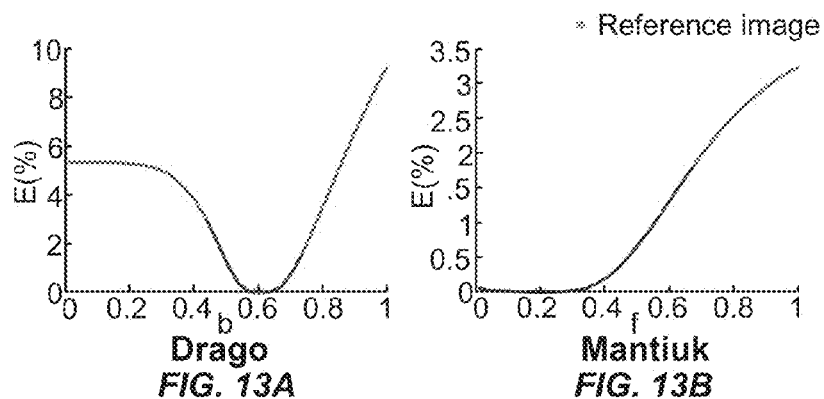
Drago
FIG. 13A
Mantiuk
FIG. 13B
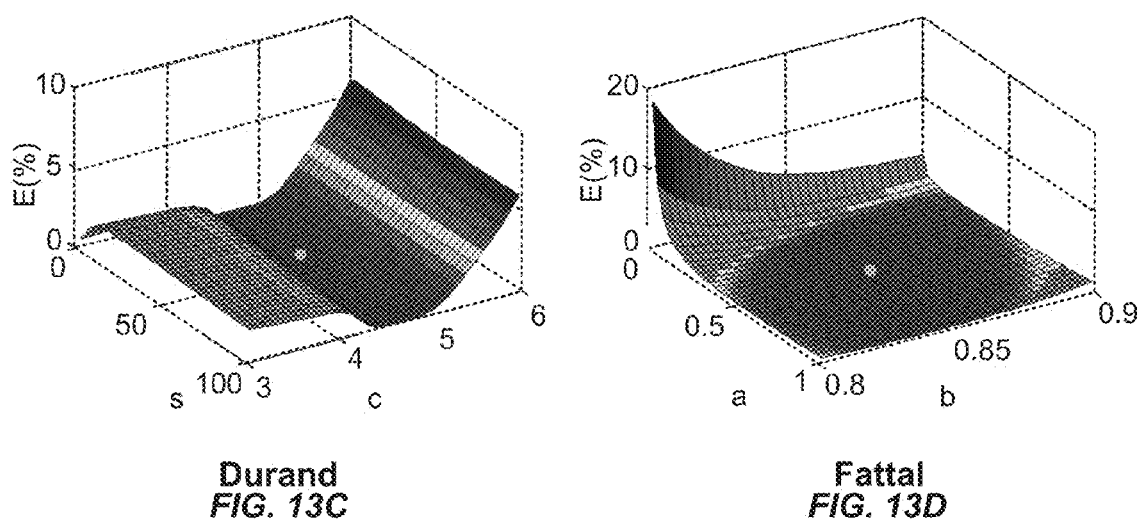
Durand
FIG. 13C
Fattal
FIG. 13D
FIG. 13 b: 0.738    b: 0.820
Drago f: 0.600    f: 0.128
Mantiuk s: 11.000   s: 100.00
c: 3.600    c: 2.280
Durand a: 0.223    a: 0.462
b: 0.930    b: 0.944
Fattal Label   0       2       4       6       8

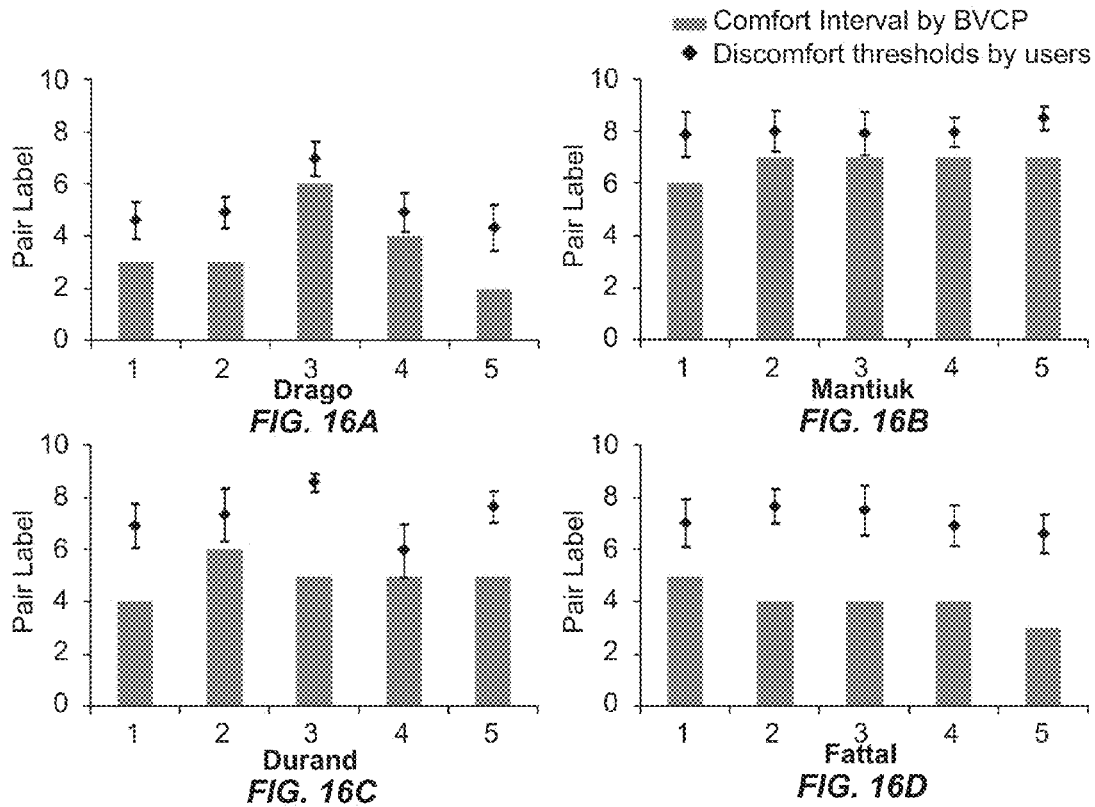
FIG. 16A Drago
FIG. 16B Mantiuk
FIG. 16C Durand
FIG. 16D Fattal
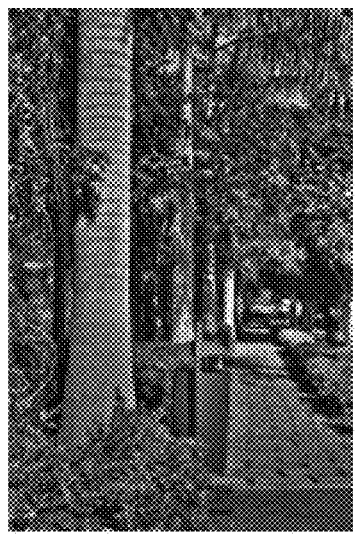
Left view
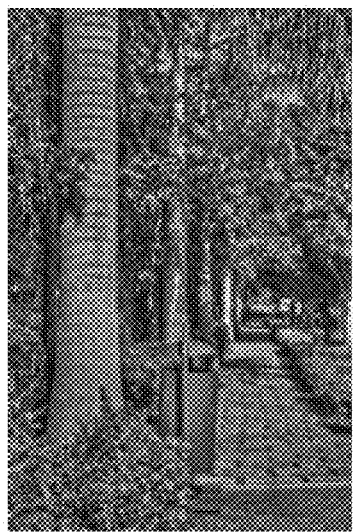
Right view
FIG. 17

Left view  Right view b=0.625  b=0.850

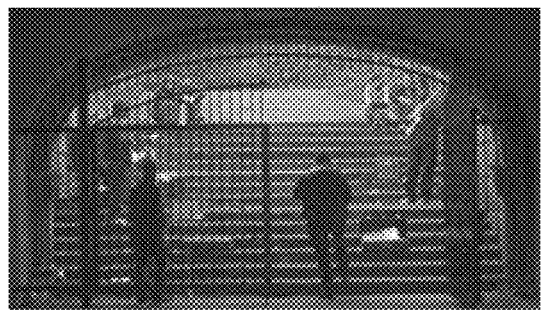
s=13.000, c=3.500
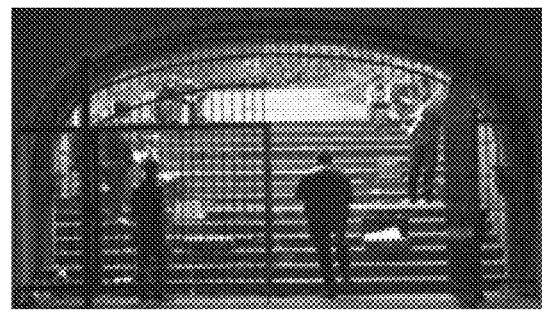
s=91.300, c=3.600
FIG. 20
a=0.734, b=0.826
a=0.857, b=0.880
FIG. 21

BINOCULAR VISUAL EXPERIENCE ENRICHMENT SYSTEM

CROSS-REFERENCES TO RELATED APPLICATIONS

This application claims benefit under 35 USC §119 of U.S. Provisional Patent Application Ser. No. 61/678,732 filed Aug. 2, 2012.

BACKGROUND OF THE INVENTION

This invention relates to computer-aided synthesis of visual images. More particularly, this invention relates to a system and method for synthesizing image pairs from a single high dynamic range image used to produce a single percept.

An additional image domain is introduced when extending from monocular display to binocular display. Existing binocular display systems only utilize this additional image domain for stereopsis. Human vision is not only able to fuse two displaced images, but also fuse two images with difference in detail, contrast and luminance, up to a certain limit. This phenomenon is known as binocular single vision. Humans can perceive more visual content via binocular fusion than just a linear blending of two views.

The popularity of 3D movies leads to the wide availability of low-cost binocular display devices. While the dual display domains (one for the left eye and the other for the right eye) double the space of visualization, existing binocular displays only serve for one type of binocular vision, stereopsis. Another commonly experienced binocular vision phenomenon in daily life is binocular single vision (or singleness of vision), i.e. images from two eyes are fused and perceived as a single percept, even though these two images are different (FIG. 2) [Howard and Rogers 2002]. Such image fusion is not a simple blending, but a complex non-linear neurophysiological process [MacMillan et al. 2007]. The first two rows of FIG. 2 illustrate the difference between fusion (the third column) and the linear blending (the fourth column). In addition, it tends to retain higher contrast, sharply focused, and brighter content from either view during the single percept formation [Steinman et al. 2000]. In other words, via the dual display, it is feasible to present more human-perceivable visual content than any single image, as vision can naturally combine two images without being aware of the difference between two images.

Unlike binocular display, high-dynamic range (HDR) display is less accessible to the general public. Even though tone mapping can be adapted to present the HDR content on a low-dynamic range (LDR) display, there is a tension between displaying large-scale contrast and fine-scale details. Striking a good balance is always challenging.

Binocular Single Vision

It is known how to combine different images, such as stereopsis [O'Shea 1983], which differs from combining different images from two eyes into a single vision or percept [von Helmholtz 1962]. While binocular single vision occurs only in a small volume of retinal area around where eyes are fixating, stereopsis occurs at places even where eyes are not fixating (when images of object appear double). It was discovered that such a fusion process is a non-linear combination of luminance, contrast, and color. To prove this, MacMillan et al. [2007] measured the interocular brightness response using asymmetrical neutral density filters and Baker et al. [2007] measured the interocular contrast response using sine-wave gratings.

This non-linear fusion is a complicated neurophysiological procedure and is generally regarded as a combination of binocular fusion and suppression [Ono et al. 1977; Steinman et al. 2000]. Binocular fusion is a process of superimposing and combining similar content from the two views into one unified and stable percept, which happens when the two views are similar or identical (FIG. 2, upper row). Binocular suppression occurs when one view (submissive) is blank, significantly dimmer, much more blurry, or has significantly less contrast than the other (dominant). In this case, a single percept is formed in the human vision system by smartly turning off all or part of the submissive view (FIG. 2, middle row). However, when the two views are too different (e.g. FIG. 2, bottom row), an undesirable phenomenon, binocular rivalry, occurs. In this case, the result is a non-converging percept composed of continuously alternating "patches" from the two views [Lei and Schor 1994], as both stimuli are too strong and none of them can suppress the other. Obviously, such continuous alternation can be noticed by an observer and causes viewing discomfort. Besides binocular rivalry, sometimes binocular suppression may also lead to visual discomfort when the stimulus is too strong. A halo or drifting can be observed as a result of inhibitory effect at the center-surround receptive fields excited by the contour [Lei and Schor 1994].

The above discomforts can greatly impede or destroy the visual experience. Hence, what is needed is an assessment tool for binocular viewing comfort. The need for an assessment tool seems to suggest an image similarity metric. There are several existing metrics, including mean squared error (MSE), structural similarity (SSIM) [Wang et al. 2004], perception-oriented metrics Visible Difference Predictor (VDP) [Daly 1993] and its extension High Dynamic Range Visible Difference Predictor (HDR-VDP, HDR-VDP-2) [Mantiuk et al. 2005; Mantiuk et al. 2011]. Known metrics consider the visible difference between two images when the observer looks at these images with both eyes. However, these existing metrics do not consider the binocular vision in which the left eye and right eye of observers are presented with two different images. An obvious shortcoming of existing metrics can be illustrated by binocular suppression (FIG. 2, middle row) where two images are obviously different using any existing metric, even though a stable percept can be formed. Hence, none of the existing metrics can be applied.

Tone Mapping:

Several sophisticated tone mapping techniques have been proposed to generate LDR images from HDR images. Reinhard [2006] provided a comprehensive survey on tone mapping techniques, ranging from sigmoidal compression to image appearance model, and to perception and engineering-based methods. Tone mapping methods can be roughly classified into global and local operators. Histogram adjustment methods and adaptive logarithmic mapping such as [Larson et al. 1997; Drago et al. 2003] are two main categories of global operators. On the other hand, there are also several prevalent local operators, such as bilateral filtering approach [Durand and Dorsey 2002], gradient domain optimization [Fattal et al. 2002] and perceptual-based contrast processing [Mantiuk et al. 2006].

Known tone mapping operators can be used as building blocks for a binocular tone mapping framework to generate two LDR images that optimally increase the human-perceivable visual content without triggering discomfort.

It desirable to produce two views that are as different as possible in order to retain more visual content from the source HDR. However, there is a limit on the difference between two views. When such limit is exceeded, binocular viewing discomfort appears, and even worse, binocular single vision may fail. Such viewing discomfort [Lambooij et al. 2009] is an important health issue receiving much attention due to the wide availability of 3D displays.

The following references provide background to the present invention:

BAKER, D., MEESE, T., MANSOURI, B., AND HESS, R. 2007. Binocular summation of contrast remains intact in strabismic amblyopia. *Investigative ophthalmology & visual science* 48, 11, 5332.

BLAKE, R., AND BOOTHROYD, K. 1985. The precedence of binocular fusion over binocular rivalry. *Attention, Perception, & Psychophysics* 37, 2, 114-124.

CARTER, R., AND HUERTAS, R. 2010. Ultra-large color difference and small subtense. *Color Research & Application* 35, 1, 4-17.

CHEN, H., AND WANG, S. 2004. The use of visible color difference in the quantitative evaluation of color image segmentation. In *Acoustics, Speech, and Signal Processing, 2004. Proceedings. (ICASSP '04). IEEE International Conference on*, vol. 3, IEEE, iii-593.

DALY, S. 1993. The visible differences predictor: an algorithm for the assessment of image fidelity. *Digital images and human vision* 11.

DRAGO, F., MYSZKOWSKI, K., ANNEN, T., AND CHIBA, N. 2003. Adaptive logarithmic mapping for displaying high contrast scenes. In *Computer Graphics Forum*, vol. 22, Wiley Online Library, 419-426.

DURAND, F., AND DORSEY, J. 2002. Fast bilateral filtering for the display of high-dynamic-range images. In *Proceedings of the 29th annual conference on Computer graphics and interactive techniques*, ACM, 257-266.

EHRENSTEIN, W., ARNOLD-SCHULZ-GAHMEN, B., AND JASCHINSKI, W. 2005. Eye preference within the context of binocular functions. *Graefe's Archive for Clinical and Experimental Ophthalmology* 243, 9, 926-932.

FATTAL, R., LISCHINSKI, D., AND WERMAN, M. 2002. Gradient domain high dynamic range compression. *ACM Transactions on Graphics* 21, 3, 249-256.

HOWARD, I., AND ROGERS, B. 2002. *Seeing in Depth*, vol. 1. I Porteous.

KOOI, F., AND TOET, A. 2004. Visual comfort of binocular and 3D displays. *Displays* 25, 2-3, 99-108.

LAMBOOIJ, M., IJSSELSTEIJN, W., FORTUIN, M., AND HEYNDERICKX, I. 2009. Visual discomfort and visual fatigue of stereoscopic displays: a review. *Journal of Imaging Science and Technology* 53, 030201.

LARSON, G., RUSHMEIER, H., AND PIATKO, C. 1997. A visibility matching tone reproduction operator for high dynamic range scenes. *Visualization and Computer Graphics, IEEE Transactions on* 3, 4, 291-306.

LEI, L., AND SCHOR, C. 1994. The spatial properties of binocular suppression zone. *Vision research* 34, 7, 937-947.

LEVELT, W. 1965. Binocular brightness averaging and contour information. *British journal of psychology* 56.

LIN, M., AND JANE, S. 2009. Analysis of color difference in digital proofing based on color management system. *Journal of Communication and Computer* 6, 10, 32.

LIU, L., TYLER, C., AND SCHOR, C. 1992. Failure of rivalry at low contrast: Evidence of a suprathreshold binocular summation process. *Vision Research* 32, 8, 1471-1479.

MAC MILLAN, E., GRAY, L., AND HERON, G. 2007. Visual Adaptation to Interocular Brightness Differences Induced by Neutral-Density Filters. *Investigative ophthalmology & visual science* 48, 2, 935.

MANTIUK, R., DALY, S., MYSZKOWSKI, K., AND SEIDEL, H. 2005. Predicting visible differences in high dynamic range images: model and its calibration. In *Proc. SPIE*, vol. 5666, SPIE, 204-214.

MANTIUK, R., MYSZKOWSKI, K., AND SEIDEL, H. 2006. A perceptual framework for contrast processing of high dynamic range images. *ACM Transactions on Applied Perception (TAP)* 3, 3, 286-308.

MANTIUK, R., KIM, K., REMPEL, A., AND HEIDRICH, W. 2011. Hdr-vdp-2: A calibrated visual metric for visibility and quality predictions in all luminance conditions. In *ACM Transactions on Graphics (TOG)*, vol. 30, ACM, 40.

MYSZKOWSKI, K. 1998. The visible differences predictor: Applications to global illumination problems. In *Rendering techniques '98: proceedings of the Eurographics Workshop in Vienna, Austria, Jun. 29-Jul. 1, 1998*, Springer Verlag Wien, 223.

NORTON, T., CORLISS, D., AND BAILEY, J. 2002. *The psychophysical measurement of visual function*. Butterworth Heinemann.

ONO, H., ANGUS, R., AND GREGOR, P. 1977. Binocular single vision achieved by fusion and suppression. *Attention, Perception, & Psychophysics* 21, 6, 513-521.

O'SHEA, R. 1983. Does stereopsis have a fusional component? *Attention, Perception, & Psychophysics* 34, 6, 599-603.

REINHARD, E. 2006. *High dynamic range imaging: acquisition, display, and image-based lighting*. Morgan Kaufmann.

STEINMAN, S., STEINMAN, B., AND GARZIA, R. 2000. *Foundations of binocular vision: A clinical perspective*. McGraw-Hill Medical.

TREISMAN, A. 1962. Binocular rivalry and stereoscopic depth perception. *The Quarterly Journal of Experimental Psychology* 14, 1, 23-37.

VON HELMHOLTZ, H. 1962. *Helmholtz's treatise on physiological optics*, vol. 3. The Optical Society of America.

WANG, Z., BOVIK, A., SHEIKH, H., AND SIMONCELLI, E. 2004. Image quality assessment: From error visibility to structural similarity. *Image Processing, IEEE Transactions on* 13, 4, 600-612.

WATSON, A. 1987. The cortex transform: rapid computation of simulated neural images. *Computer Vision, Graphics, and Image Processing* 39, 3, 311-327.

WOPKING, M. 1995. Viewing comfort with stereoscopic pictures: An experimental study on the subjective effects of disparity magnitude and depth of focus. *Journal of the Society for Information Display* 3, 3, 101-103.

SUMMARY OF THE INVENTION

According to the invention, in a computer-based graphics imaging system, binocular tone mapping is employed with an optimization-based binocular tone mapping framework to produce low-dynamic range (LDR) image pairs to generate a binocular single vision image preserving more human-perceivable visual content than an arbitrary single image while simultaneously avoiding viewing discomfort. More specifically, given a tone-mapped LDR image (left, without loss of generality) of a source HDR image, the inventive framework optimally synthesizes its counterpart (right) of the image pair from the same source HDR image. The extra image space of the binocular framework is employed to enhance the image content (e.g. enlarge the contrast, boost the brightness, or enhance more details), while visual information of the rest of the image is preserved in another image space, the binocular tone mapping being guided by a binocular viewing comfort predictor (BVCP) metric in order to assure stable formation of binocular single vision and avoid viewing discomfort. The initial BVCP metric is designed to avoid visual discomfort for most individuals. The optimization-based framework generates the correct tone-mapped image with the goal of maximizing the overall visual information content under the guidance of a BVCP.

The invention is believed to be the first attempt in the graphics area to enrich the visual experience with binocular single vision. Thus the invention provides image improvement for existing tone mapping techniques.

The disclosed metric is believed to be a novel metric for measurement of the viewing discomfort due to binocular content difference.

The utilization of an optimization-based binocular tone mapping framework to produce low-dynamic range (LDR) image pairs that preserve more human-perceivable visual content than an arbitrary single image while simultaneously avoiding viewing discomfort is believed to be unique.

Further according to the invention, it is disclosed how to utilize an existing LDR binocular display to simultaneously present the contrast and details in HDR images by a binocular tone mapping framework. Given a source HDR image and its tone-mapped LDR image (such as a left-eye view) that is generated by known tone mapping techniques, the inventive framework optimally synthesizes its counterpart (right) LDR image in the binocular image pair. Thus, through the phenomenon of binocular single vision, the two LDR images aggregate to present more human-perceivable visual content than any arbitrary single LDR image.

The inventive framework has been evaluated with four state-of-the-art tone mapping methods, including bilateral filtering approach [Durand and Dorsey 2002], gradient domain HDR compression [Fattal et al. 2002], adaptive logarithmic mapping [Drago et al. 2003] and perceptual-based contrast processing [Mantiuk et al. 2006].

The invention will be better understood by reference to the following detailed description with accompanying drawings.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fees.

FIG. 9 is an illustration of contour matching.

FIGS. 10A and 10B are a pair of graphs illustrating luminance and frequency vs. contrast.

FIGS. 13A, 13B, 13C, and 13D are a four-part set of graphs for visualization of binocular visual differences of for mapping operators of an HDR image.

FIGS. 16A, 16B, 16C, and 16D are a four-part set of graphs illustrating statistics of predictability of BVCP for four different tone mapping operators.

FIG. 17 is a stereo LDR image pair with left and right images tone-mapped differently.

FIG. 20 is an image pair produced using Durand's operator.

FIG. 21 is an image pair produced using Fattal's operator.

DETAILED DESCRIPTION OF THE INVENTION

Figure 1A:
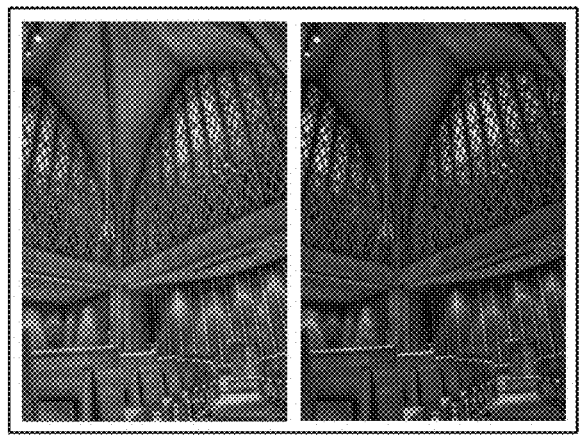
FIG. 1A shows a first binocularly tone-mapped image pair generated according to the invention.
Figure 1B:
FIG. 1B shows a second binocularly tone-mapped image pair generated according to the invention.
Figure 2:
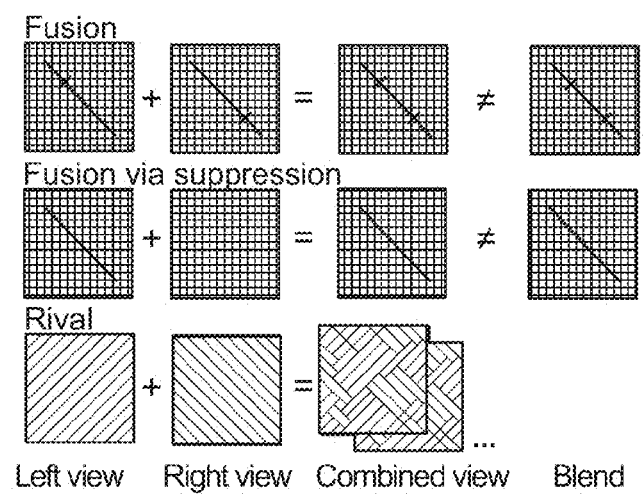
FIG. 2 is a graphic illustration comparing binocular fusion; fusion by suppression and binocular rivalry.

According to an embodiment of the invention, a novel technique in computer graphics utilizes a human vision phenomenon and proposes a binocular tone mapping framework. The proposed framework generates a binocular low-dynamic range (LDR) image pair that preserves more human-perceivable visual content than a single LDR image using the additional image domain. Given a tone-mapped LDR image (left, without loss of generality), the inventive framework optimally synthesizes its counterpart (right) in the image pair from the same source HDR image. The two LDR images are different, so that they can aggregate to present more human-perceivable visual richness than a single arbitrary LDR image without triggering visual discomfort. For example, in FIGS. 1A and 1B, one image within each pair presents more global contrast (the left image of each pair) while the other presents more local details (the right image of each pair). To achieve this, a novel binocular viewing comfort predictor (BVCP) is employed to minimize risk of such visual discomfort. The design of BVCPs is based on findings in vision science. Through user studies, it has been confirmed that, in the inventive technique, there is an increase of human-perceivable visual richness, and that there is efficacy in the proposed BVCP in conservatively predicting the visual discomfort threshold of human observers.

Figure 3A:
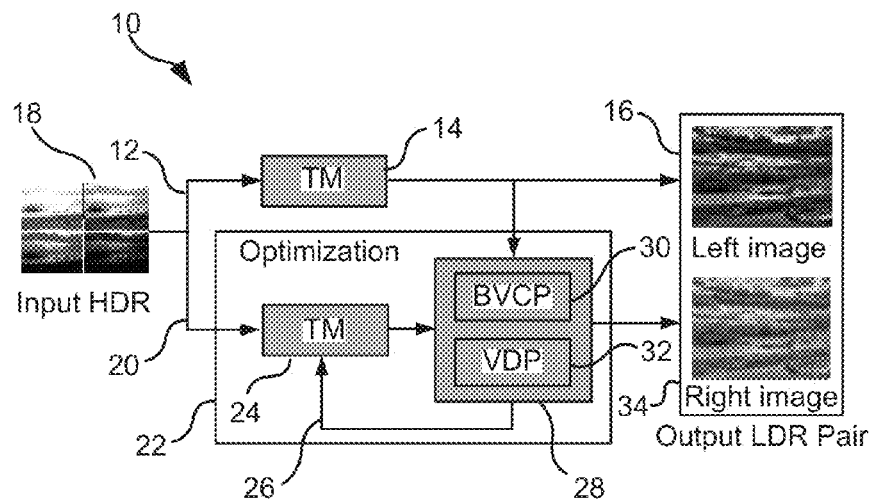
FIG. 3A is a functional block diagram of a system for generating LDR image pairs from an input HDR image in accordance with the invention.
Figure 3B:
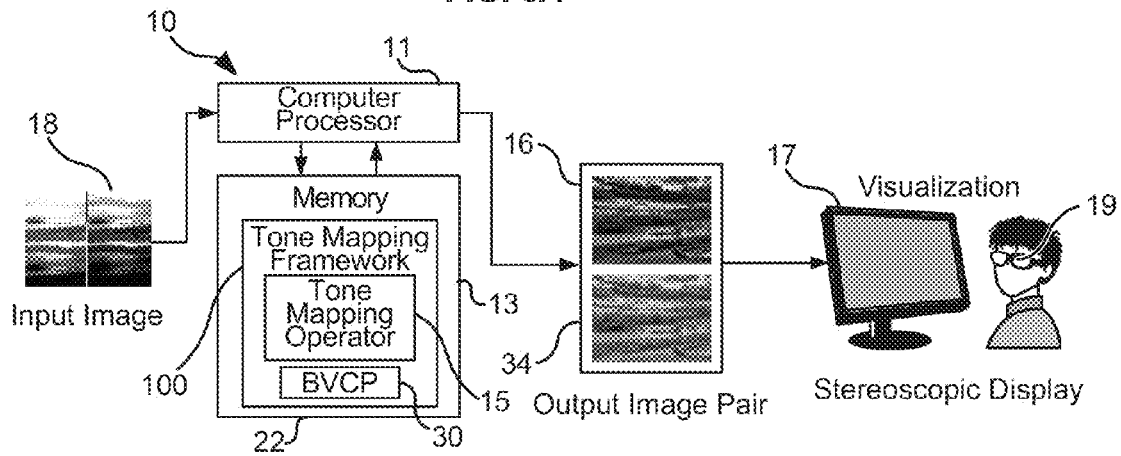
FIG. 3B is a block diagram for illustrating elements of the invention.

An overview of the system 10 implemented on a computer processor 11 with associated memory 13 according to the invention is illustrated in FIGS. 3A and 3B. In the memory 13 is stored program code for a tone mapping framework 100, including at least one tone mapping operator 15 and BVCP 30 as part of an optimization subsystem 22. The framework 100, when invoked, provides a first channel 12 comprising a direct tone mapper 14 configured to produce a first (left) image output 16 from an HDR input image 18. A second channel 20 is provided that comprises the optimization framework processor 22 with a second tone mapping operator or tone mapper 24 configured to receive input of the input HDR 18, and to receive feedback on a feedback path 26 from a predictor element 28 that includes the BVCP 30 and a Visible Difference Predictor (VDP) 32 that is configured to output the second (right) image 34 of the output LDR pair. The BVCP 30 is configured to receive as a second (right) input the output of the tone mapper 14. The output of both LDR images is provided as a pair to a visualization element such as a stereoscopic display 17 viewable with appropriate 3D image separators 19, as needed. The invention may be implemented using a general purpose computer processor 11, including a personal computer, a tablet, a mobile communication/computing device and the like, so long as it has sufficient amount of memory, a suitable input, a suitable output or display and sufficient processing capabilities. The processes discussed herein can be implemented according to the functions herein disclosed in appropriate computing languages.

In operation, and referring to FIGS. 3A and 3B, the input to the system 10 is provided in the form of a single HDR image 18. (For stereo, two HDR images are provided, either serially or in parallel.) Two parallel signal (image) paths 12, 20 are invoked to produce paired LDR output images 16, 34, namely one channel having only a first tone mapper or TM 14, and the other path having the optimization framework processor 22, both functioning within a conventional or specialized computer processor 11 and associated random access memory 13 performing under a conventional or specialized computer operating system (not shown) with associated support components (not shown). The optimization framework processor 22 comprises second tone mapper TM 24 in a feedback loop with BVCP 30 processor and a VDP processor 32, which also receives input from the first tone mapper 14. The output of the optimization framework processor 22 is the second output LDR image 34 of the LDR output image pair 16, 34.

A pseudo-code listing of the operation is given below:

---
Binocular Tone Mapping Algorithm

Given an input HDR
Select a tone mapping operator
Generate one LDR image by manually specifying or automatically
suggesting parameters, and set it as the left LDR image
// Optimization to find optimal right LDR image to form the output pair
Distribute n random seeds in the tone-mapping parameter space (i.e. n=10)
For each seed point (p)
    // Perform gradient ascent approach
    Set initial step (s) to user-defined maximum
      Generate the current right LDR image with p
    E = Evaluate the VDP between the current left and right LDR images
    while step > threshold and search inside the space
        Determine the gradient direction (v) in the VDP domain
        Move the parameter point along v by step s, i.e. p' = p + s v
        Generate the right LDR image with new p'
        Evaluate the new VDP of the current left and right LDR images
        If (new VDP > E) and (both left and right LDR pass BVCP)
            p = p'
            E = new VDP
        else
            s = s / 2
Output the image pair (left and right LDR image) with maximum
VDP among n seeds
END

---

In operation, a first LDR image is first tone-mapped from the source HDR image using a selected tone mapping operator in the first channel FIGS. 3A and 3B. The parameter(s) for generating the LDR image can be manually specified or automatically suggested by the operator (default parameters). State-of-the-art tone mapping operators may be employed as the TM 14 and 24. Four such tone mappers have been tested and are supported, namely Drago, Durand, Fattal and Mantiuk, as described previously and reported in the literature. Other tone mapping operators may also be adopted.

The goal of the system is to generate the optimal right LDR image using the same or same type of tone mapping operator as the left channel, by maximizing the visual difference between two views while avoiding any visual discomfort. The optimization framework processor 22 generates the optimal right-side view by iteratively adjusting the tone mapping parameters in a gradient ascent fashion. The iteration continues until the objective value converges to produce the second or right image as in the second channel 20 on the lower path in FIGS. 3A and 3B.

The objective function comprises two metrics, a visible difference predictor (VDP) 32 such as taught by Daley [Daly 1993] (the content of which is incorporated by reference for all purposes and a binocular viewing comfort predictor (BVCP) 30, as hereinafter explained (Section 4), corresponding to the total amount of visual content and the viewing comfortability, respectively. The BVCP function is set as a hard constraint such that any LDR image pair leading to discomfort is rejected. During each iteration the tone mapping parameters are adjusted (in an iterative feedback process) to follow the gradient ascent direction, based on the VDP of the current LDR image pair. If the LDR image pair cannot pass the BVCP metric test, the step size of gradient ascent is reduced.

Since the gradient ascent approach is sensitive to initial values, it can be easily trapped by a local optimum. To increase the chance of finding the global optimum, n random seeds are distributed in the search space and the search is for n paths accordingly. The final output is the best among the n pairs. In current configurations, n=10.

Binocular Viewing Comfort Predictor

While tone mapping limits the visual content for display, binocular tone mapping offers one additional domain for visualization. An obvious way to exploit the dual image domain is to ensure the two images span different dynamic ranges in order to maximize the total amount of visual content. However, there is a limit on the difference between the two images. When such limit is exceeded, rivalry and high level suppression appear and lead to visual displeasures, such as flicker, nausea and fatigue.

To avoid such viewing discomfort, the BVCP metric is used. The BVCP metric was determined by examination of results of known psychophysical studies [Levelt 1965; Liu et al. 1992; Steinman et al. 2000; Kooi and Toet 2004]. In particular, the inventive BVCP measures the difference between the left and right images, in terms of contour density, contrast, luminance, and color. The limit of contour density can be relaxed when the contrast is small. This phenomenon is called failure of rivalry, found by Liu et al. [1992]. Such relaxation allows more visual information to be represented. This phenomenon is used in the inventive BVCP design.

Fusional Area

Whether two corresponding points in the left (L) and right (R) images can be fused into a single percept or not requires a complex consideration. The decision is not solely based on the local colors of the two points, but based on the visual agreement of neighborhoods surrounding the two points. This neighborhood is called Panum's fusional area in the literature of vision science. Fusional area is an area on the retina. In graphics terminology, fusional area occupies a constant solid angle subtended at the eye. When it is stimulated together with a given single retinal point in the other eye, a single binocular percept is formed [Steinman et al. 2000]. When both of an observer's eyes fixate at a pixel with position (i,j) in both left and right images, the whole fusional areas (both left and right) surrounding the position (i,j) must be considered for fusion stability, in terms of contour, contrast, luminance and color differences.

Figure 4:
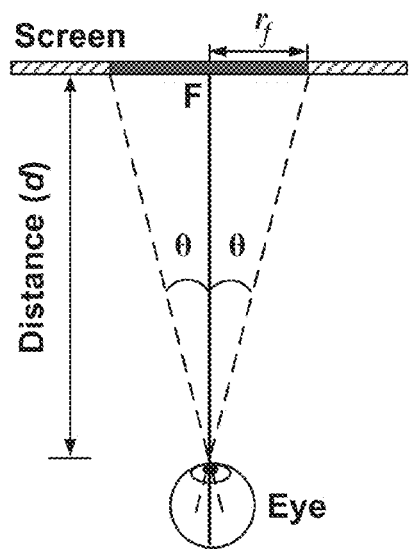
FIG. 4 is a diagram for illustrating fusional area.

By projecting the fusional area to the screen via the pupil (FIG. 4), one can compute the size of projected fusional area in terms of pixel units. For simplicity hereinafter, fusional area means the projected fusional area. Suppose the observer is sitting in front of the screen at distance d. Assume all pixels are projected onto the screen equally and have a square shape (aspect ratio=1). The pixel density on the screen is γ pixels per inch (PPI). FIG. 4 explains the notations. The radius of the fusional area in pixel units can be computed as, $$rf = \gamma \tan\theta \cdot d \qquad (1)$$

where θ is the maximal retinal disparity, which is around 60 to 70 arcmin [Wopking 1995] for most people. Hence, the fusional area ξ in the image is a circular neighborhood of radius $rf$. To simplify computation, approximate the neighborhood by a rectangle of $2rf \times 2rf$ pixels instead. Note that $rf$ is a function of viewing distance d, which means the viewing distance affects the viewing comfort.

As an observer's eyes may fixate at an arbitrary pixel position in the image pair, all pixel pairs from the LDR image pair must be considered in their corresponding fusional areas in order to measure the fusion stability. All following assessments consider the fusional area ξ at an arbitrary position (i,j). The corresponding fusional areas in the left and right images are denoted as L and R.

Contour Fusion

Figure 5:
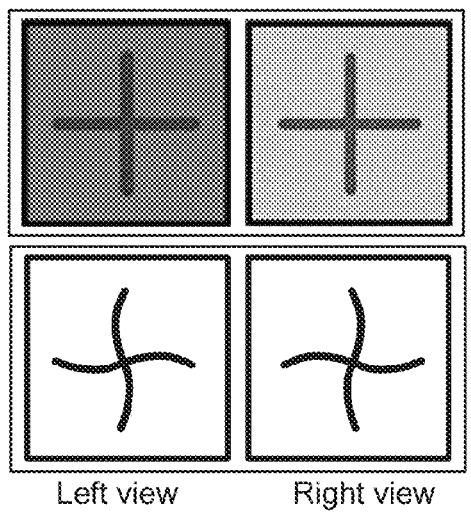
FIG. 5 is a graphic for illustrating contour dominance.

It has been found that the contour (edge) difference is more important than the contrast or color differences in determining binocular fusion [Treisman 1962]. FIG. 5 illustrates this idea. Although the images in the upper image pair are different in terms of color and contrast, they can still be fused because their contours are very similar. On the other hand, even the color and contrast are very similar, the lower image pair cannot be fused (i.e. rivalry) as their contours are noticeably different. Note that, when two areas have similar contours, only extremely large color difference or contrast inversion may result in rivalry (to be explained later).

Figure 6:
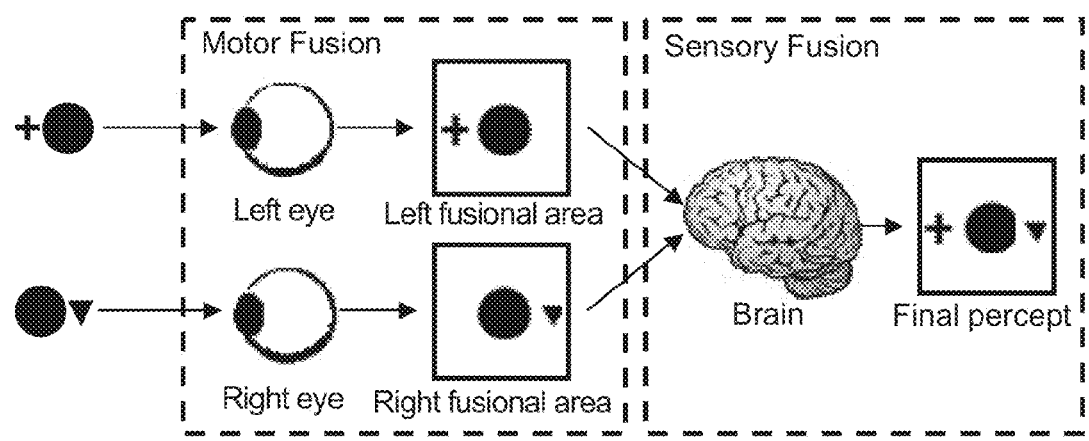
FIG. 6 is a functional block diagram for illustrating sensory fusion into a final precept.

Contour fusion does not require contours in the two corresponding fusional areas L and R to be exactly the same, because our eyes have two mechanisms, motor fusion and sensory fusion. Motor fusion superimposes corresponding points or similar contour by the movement of our eyes. After the alignment by motor fusion, a neurophysiological process, sensory fusion, combines the two views into one unified percept. As illustrated in FIG. 6, left and right views are first aligned to superimpose the 'disk' by motor fusion, then the 'cross' and 'triangle' are both fused into the final percept by sensory fusion. So the precondition of sensory fusion is that part of the contour can successfully trigger motor fusion. Evaluating the percentage of contour that can be aligned by motor fusion provides guidance of whether a stable fusion can be formed. Blake and Boothroyd [1985] demonstrated that areas containing 50% matched and 50% unmatched contour segments can still be successfully fused.

Figure 7:
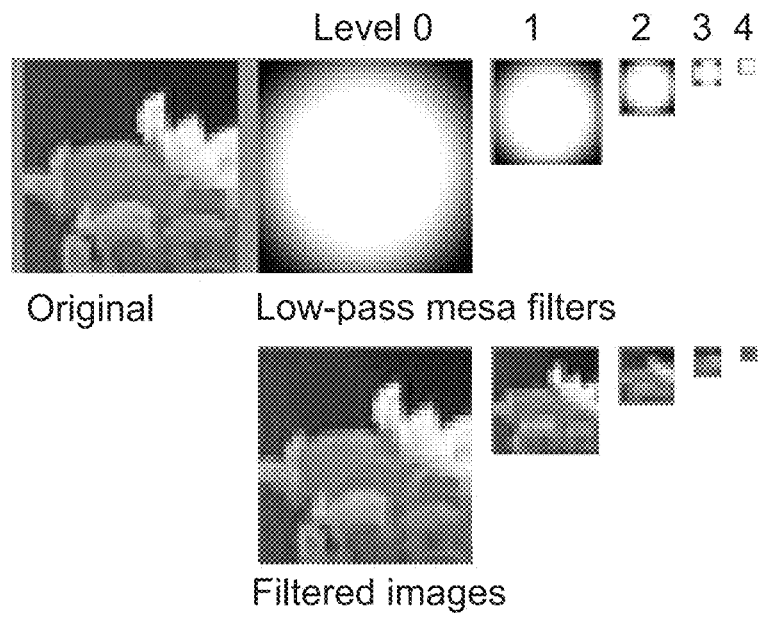
FIG. 7 is an illustration of a mesa pyramid of a mesa filter.

Contour (edge) has different definitions in different domains. Herein, a meaningful contour segment is defined as obvious color difference expanding to, or beyond a specified visual degree. To figure out as many contour segments as possible, a scale space representation is applied to the fusional area. Constructing a pyramid from the original fusional area, first Fourier transform the fusional area to the frequency domain. Then apply a pyramid of low-pass filters in this frequency domain (FIG. 7, upper row). By inversely Fourier transforming each low-passed frequency images, one obtains a pyramid of low-passed fusional areas (FIG. 7, lower row). The low-pass filter selected is called a mesa filter [Watson 1987; Daly 1993]. It can be approximately regarded as a kind of truncation at half-amplitude frequency. Such frequency property conforms with the requirement in determining the failure of rivalry, which will be discussed later. This is the rationale behind use of the mesa filter. Suppose the pyramid has K levels in total, the radius of the level-0 kernel is $r_f$ pixels while that of level-(K−1) kernel is 1 pixel.

Define the contour based on the concept of visual acuity (VA). A well-designed diameter of letter 'C' or height of letter 'E' in Landolt C and Tumbling E Chart is five times the visual acuity. Hence, one defines contour segment to be meaningful when its occupied visual degree reaches or exceeds 5·VA (a typical human eye has the visual acuity to separate 1-2 arcmin). Thus the lowest level of mesa pyramid involved in the computation should be level S with a width of less than or equal to (tan θ/tan(VA/24)). With such a mesa pyramid, obvious color differences between two adjacent pixels in each level is regarded as a segment of visible contour. For each pair of fusional areas L and R, two mesa pyramids are set up respectively. The k-th level of the pyramids are denoted as $L^k$ and $R^k$, where $k \in [5, K-1]$.

To identify a contour, we measure the color difference ΔEc between the adjacent pixels. It is defined as a 2-norm distance of their colors in LAB color space. Consider FIG. 9, the color difference between a pair of pixels (red and blue pixels) with positions, p1 and p2, in the left image is $$\Delta L^k(p_1, p_2) = \Delta E_c(L^k(p_1), L^k(p_2)) \qquad (2)$$

Similarly, one can obtain $\Delta R^k(p1, p2)$ for the right image. Now one can predict their fusion state $S^k(p1, p2)$ (i.e. whether a contour is recognized by an observer) by looking up a decision table (Table 1), with $\Delta L^k(p_1, p_2)$ and $\Delta R^k(p_1, p_2)$ as query. In this table, JND stands for a constant called just noticeable color difference and OCD stands for another constant called obvious color difference. According to existing studies [Chen and Wang 2004; Lin and Jane 2009], we set JND=2.3 and OCD=6.0. If both $\Delta L^k(p_1, p_2)$ and $\Delta R^k(p_1, p_2)$ are less than OCD, no contour is recognized. So, the fusion state is set to be 0 (stands for 'no contour'). If both of them reach OCD, two obvious contour segments are recognized and fused together. Hence the fusion state is set to be 1 (stands for 'match'). Confusion appears only when one of the color differences reaches OCD, while the other falls below JND, in that case the fusion state is set to be −1 (stands for 'not match'). If one reaches OCD and the other falls between JND and OCD, it can still be regarded as support for existence of contour. Hence the state is 1 too.

TABLE 1

Decision table for contour fusion where J = JND, O = OCD.

| | ΔR$^k$ | | |
|---|---|---|---|
| ΔL$^k$ | <J | J~O | >O |
| <J | 0 | 0 | −1 |
| J~O | 0 | 0 | 1 |
| >O | −1 | 1 | 1 |

The k-th level of two corresponding fusional areas ($L^k$ and $R^k$) are regarded as fusible if the count of '1' (match) is equal to or larger than the count of '−1' (not match). On the other hand, if the count of '1' is smaller than that of '−1', $L^k$ and $R^k$ are not fusible. If both $L^k$ and $R^k$ contain no contour, contour fusion takes no effect, and the final fusion state is determined by other levels. Here, record the contour fusion state of two fusional areas at the k-th level in the pyramid with a state variable $B^k$ as follows (0 stands for 'no contour', 1 stands for 'fused', and −1 stands for 'not fused'), $$B_{cf}^k = \begin{cases} 0, & \text{if } \sum_{(p_1,p_2) \in \zeta} |S^k(p_1, p_2)| = 0 \\ 1, & \text{else if } \sum_{(p_1,p_2) \in \zeta} |S^k(p_1, p_2)| \geq 0 \\ -1, & \text{otherwise.} \end{cases} \quad (3)$$

Note that the contour fusion states at higher levels override the lower ones, so $$B_{cf}^{k-1} = B_{cf}^k \text{ if } B_{cf}^k \neq 0 \quad (4)$$

The final fusion state of two fusional areas is, $$B_{cf} = B_{cf}^S \quad (5)$$

Contour and Regional Contrasts

The differences in luminance can be generally referred to as contrast. Two types of contrast can influence the binocular single vision. They are contour contrast and regional contrast. Contour contrast coexists with contour if it can be detected by human eye. Matched contour pair generally helps the fusion except when their contrasts are obviously inversed. So, revise $S^k(p1,p2)$ before evaluating Eq.3 as follows. When a pair of matched contour has obviously inversed contrast, their fusion state changes to −1 ('not match'). The revised function is:

$$S^k(p_1,p_2) = -1, \text{ if } |C(L^k(p_1),L^k(p_2))| > OCD$$

$$\text{and } |C(R^k(p_1),R^k(p_2))| > OCD$$

$$\text{and } C(L^k(p_1),L^k(p_2)) \cdot C(R^k(p_1),R^k(p_2)) < 0 \quad (6)$$

where $C(c1, c2)$ computes the lightness difference between the pixel pair $c1$ and $c2$.

Regional contrast refers to the contrast between two regions (in our case, the two corresponding fusional areas). It has a relatively smaller impact on the viewing comfort (compared to contour fusion), unless the two regions differ too much [Kooi and Toet 2004]. A restrictive constraint for regional contrast is preferred, such that the average color difference between two fusional areas L and R must be less than a distinct color difference (DCD). According to the existing study [Carter and Huertas 2010], we set DCD=34. The viewing comfort due to the regional contrast (Brc), between two corresponding fusional areas, is assessed by $$B_{rc} = \begin{cases} 1, & \text{if } \sum_{p \in \zeta} (\Delta E_c(L(p), R(p))) \cdot \frac{1}{4r_f^2} < DCD \\ -1, & \text{otherwise,} \end{cases} \quad (7)$$

where $L(p)$ and $R(p)$ are two corresponding pixels located at position p in L and R, respectively.

Failure of Rivalry

Figure 8:
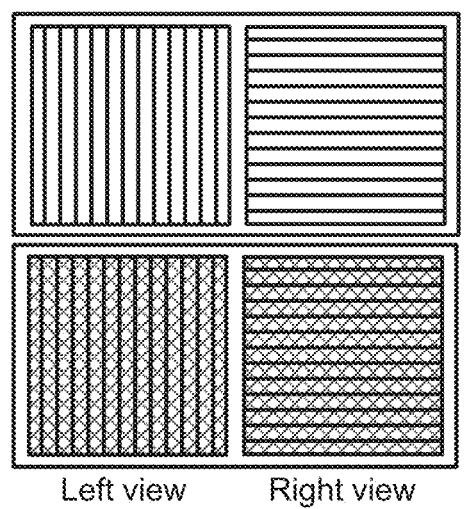
FIG. 8 is an illustration showing a pair of images and a resultant failure of rivalry.

Normally when contour fusion fails, rivalry or over-suppression occurs and leads to discomfort. However, it was discovered that the occurrence of rivalry depends also on contrast. When contrast is below a certain threshold, a stable single percept always forms regardless of the contour fusion criteria mentioned above. This phenomenon is called failure of rivalry and more likely to happen in low-contrast regions. FIG. 8 illustrates this phenomenon. The upper image pair cannot be fused because of the contour difference. Conversely, the lower image pair has the same contours but with much lower contrast and luminance. In this case, they can still be fused thanks to the failure of rivalry. The contrast threshold is a function of image luminance and spatial frequency [Liu et al. 1992]. It is negatively related to the luminance (FIG., FIG. 10A originated from FIG. 3A in [Liu et al. 1992]) while positively related to the spatial frequency (FIG. 10B, originated from FIG. 4 in [Liu et al. 1992]). The contrast is measured in log space as log percentage contrast between a pair of pixels, c1 and c2, expressed as, $$P(c_1, c_2) = \log_{10}\left|\frac{\Gamma(Y_1) - \Gamma(Y_2)}{\Gamma(Y_1) + \Gamma(Y_2)}\right|, \quad (8)$$

where Y1 and Y2 are the normalized luma of c1 and c2, respectively. $\Gamma(Y)$ maps the normalized luma Y in [0, 1] to the physical measurement in the unit of cd/m2.

Figure 11:
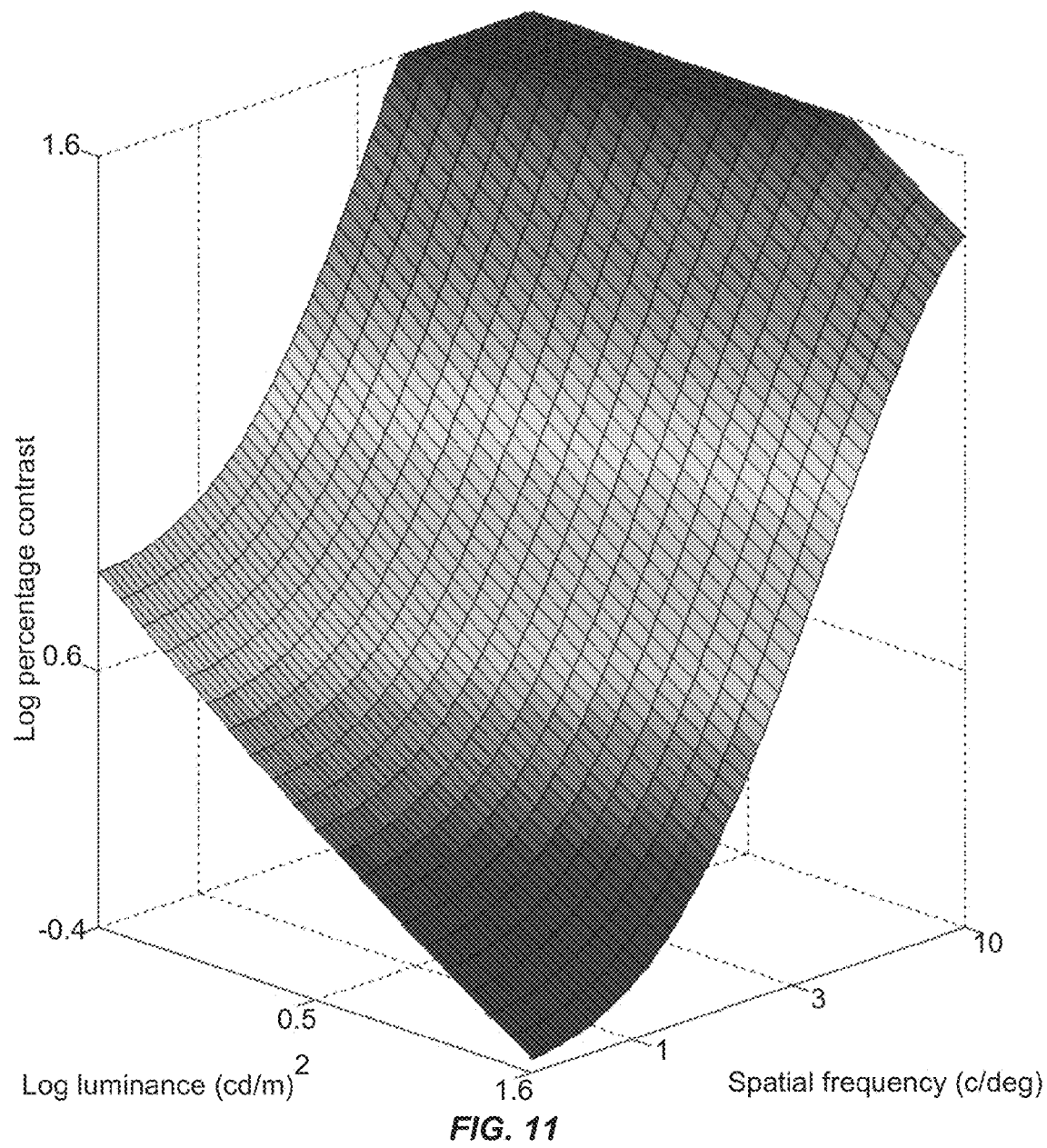
FIG. 11 is a three axis graph illustrating a constructed log percentage contrast threshold.

Whenever the contrast value is below the contrast threshold, a stable single percept always forms. However, known reports in the literature are either of measurement of the contrast threshold against luminance or of the contrast threshold against spatial frequency. However, the present invention formulates contrast threshold as a function of both luminance and spatial frequency. The procedure is as follows: Construct the contrast function based on the existing findings in the literature. Then fit the plots (blue dots) in FIGS. 10 and 10B to obtain two continuous curves (red curves), expressed as, $$T(l) = \min(2, 1.999 - 0.362 \log_{10}(l) + 0.026 \log_{10}^2(l)) \quad (9)$$

$$T(f) = \min(2, \log_{10}(3.557 - 1.334f + 1.881f^2 - 0.108f^3)) \quad (10)$$

where l is average luminance measured in cd/m2, $f$ is the spatial frequency measured in cycles per degree, and T represents log percentage contrast threshold. When l=40 cd/m2 and $f$=5 cy/deg, Eq. 9 and 10 fixate at the same percentage contrast threshold. By assuming the curvature is constant, extrapolate a function of both luminance and spatial frequency as $$T(l,f) = \min(2, \log_{10}(3.557 - 1.334f + 1.881f^2 - 0.108f^3) + 0.514 - 0.362\log_{10}(l) + 0.026\log_{10}^2(l) + \delta) \quad (11)$$

where δ is user parameter and is set to a value in [−0.15, 0.15]. Its default value is 0. FIG. 11 visualizes Eq. 11 in three dimensions.

Including the failure of rivalry in the metric of the invention allows acceptance of more pairs of LDR images and further maximizes the information content of the optimal pair. To incorporate the failure of rivalry into the metric, the procedure is as follows: First compute the average luminance $l_L$ in the left fusional area L as $\Gamma(\overline{Y}_L)$, where $\overline{Y}_L$ is the average luma in L.

$$T_L^k = T(l_L, f_k) \quad (12)$$

Similarly, one can obtain $T_R^k$. So their common threshold $T^k$ is $\min(T_L^k, T_R^k)$. When the contrast is below this threshold $T^k$, stable fusion always forms and hence $S^k(p1, p2)$ can never be negative ('not match'). Thus, take a second revision to the fusion state variable $S^k(p1, p2)$, as follows:

$$S^k(p_1,p_2) = 0, \text{ if } S^k(p_1,p_2) < 0$$

$$\text{and } P(L^k(p_1), L^k(p_2)) \leq T^k$$

$$\text{and } P(R^k(p_1), R^k(p_2)) \leq T^k \quad (13)$$

The Overall Fusion Predictor

With the contour fusion predictor $B_{cf}$ and the regional contrast predictor $B_{rc}$ defined above, one can now predict the ultimate viewing comfort for an arbitrary pair of fusional areas by:

$$B = \begin{cases} -1, & \text{if } B_{rc} = -1 \\ B_{cf}, & \text{otherwise.} \end{cases} \quad (14)$$

Figure 12A:
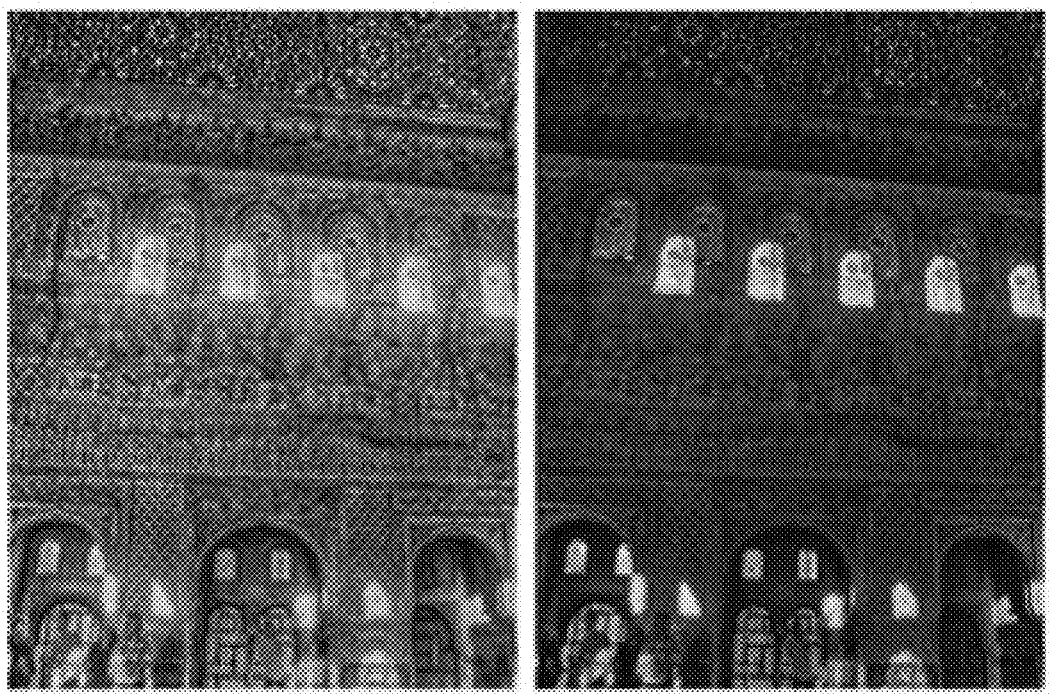
FIGS. 12A and 12B are a set of paired illustrations showing visualization of BVCP assessment.
Figure 12B:
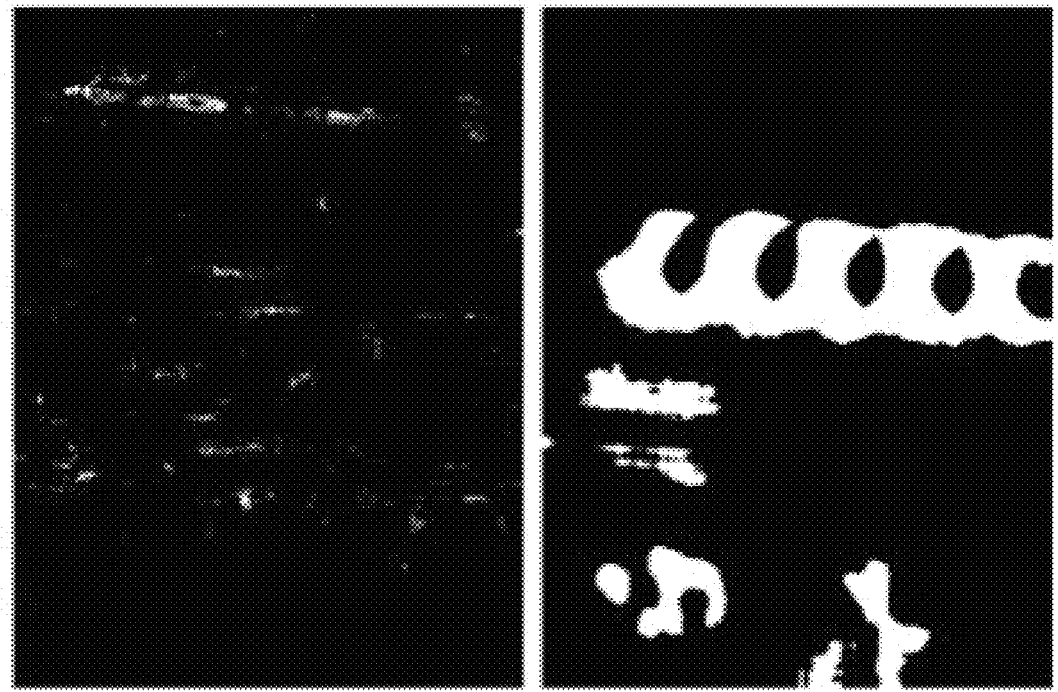
Figure 14A:
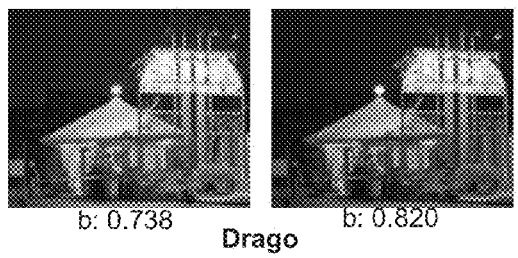
FIGS. 14A, 14B, 14C, and 14D are a four-part set of images for visualization of optimal image pairs generated according to the invention using four different tone mapping operators.
Figure 14B:
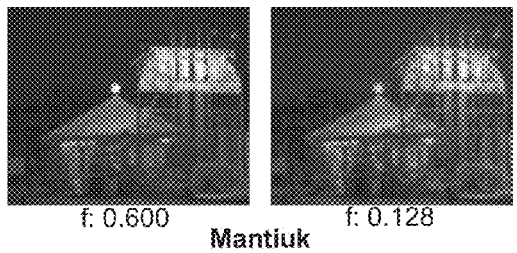
Figure 14C:
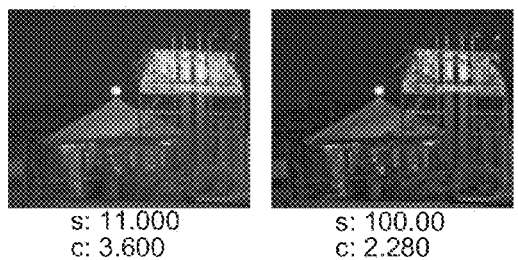
Figure 14D:
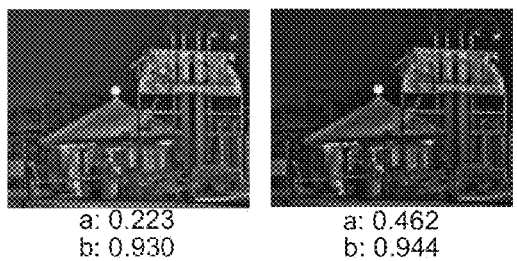

When B=−1 ('not fused'), viewing discomfort exists. FIGS. 12A and 12B show a pair of LDR images and their BVCP assessment result according to a viewing environment described herein. The white pixels indicate the areas triggering viewing discomfort when eyes fixate at these locations.

So far, only the BVCP test of two fusional areas have been described. An image pair passes the BVCP test only when substantially all pixels pass the BVCP test, i.e. no pixel in the image triggers visual discomfort (B=−1). While it is preferred that all pixels pass the BVCP test, human observers may be able to tolerate certain amount of pixels violating the BVCP without undue discomfort.

Optimization

In general, the greater the differences between the left and right images, the more visual content they can preserve in aggregate. To measure the visual difference, the visible difference predictor (VDP) [Daly 1993] can be adopted. The VDP has been utilized in various applications [Myszkowski 1998]. Given a pair of images, the output of VDP is a probability of detecting visible difference, V(i,j), at each pixel location (i,j). The overall binocular visual difference E is defined by:

$$E = \frac{1}{\Omega} \sum_{i,j} (H[V(i,j) - \tau])$$

where $\tau$ is a user-defined probability threshold and generally set as 75%. H is the Heaviside step function. $\Omega$ is the total number of pixels in the image.

With the VDP and the proposed BVCP, the present optimization framework maximizes E without violating the BVCP criteria (FIG. 3). Throughout the optimization, the left image remains unchanged. Only the right image is iteratively generated by adjusting the tone mapping parameter(s) in a gradient ascent fashion. The pair of the left image and the generated right image in the current iteration is evaluated with the BVCP test. If the pair fails the BVCP test, the current right image is rejected and the step size is reduced to generate a new one. Such process is repeated until the BVCP test is finally passed or the step size drops to zero. FIGS. 13A-13D show plots of E against the parameters of four tone mapping operators for an HDR example in FIG. 20. Since the upper two tone mapping operators have only a single parameter, their plots are 2D. On the other hand, the lower two tone mapping operators have two parameters, their plots are 3D. The red region in each plot indicates that the corresponding tone-mapped right image will trigger visual discomfort. They are predicted by the BVCP. The green dot corresponds to the tone mapping parameter(s) of the left view.

Results and Discussions

The present framework is independent of the adopted tone mapping operators. In the current implementation, four state-of-the-art tone mapping operators are supported, including bilateral filtering approach [Durand and Dorsey 2002], gradient domain HDR compression [Fattal et al. 2002], adaptive logarithmic mapping [Drago et al. 2003] and perceptual-based contrast processing [Mantiuk et al. 2006]. Both global and local tone mappings are included in these operators. The bilateral filtering approach [Durand and Dorsey 2002] is a two-scale decomposition of the image into a base layer, encoding large-scale variations, and a detail layer. Gradient domain HDR compression [Fattal et al. 2002] manipulates the gradient field of the luminance image by attenuating the magnitudes of large gradients. Adaptive logarithmic mapping [Drago et al. 2003] displays high-contrast scenes by logarithmic compressing the luminance values and imitating the human response to light. Perceptual-based contrast processing [Mantiuk et al. 2006] enhances or compresses the contrast in a visual response space, in which the contrast values directly correlate with their visibility in an image.

To demonstrate the effectiveness of the framework, all four operators with the invention have been tested on a rich variety of test images. FIGS. 14A-D shows four LDR pairs mapped from the same source HDR, but with different tone mapping operators. In each pair, the left image is tone-mapped with user-specified tone mapping parameters. On the other hand, the right one is automatically optimized by our framework to maximize the overall visual content without triggering visual discomfort. Note that the left and right images can be interchanged without significantly affecting the visual experience. The perceived binocular single percept generally preserves more details (especially in FIGS. 14A & 14B) and better contrast (especially in FIGS. 14C & 14D) than a single tone-mapped image. More results can be found in the supplementary materials.

User Study

To validate the inventive method, user studies have been conducted. The experiment set-up used a Zalman ZM-M215W 21.5" 3D LCD display with the highest luminance of around 300 cd/m2 for displaying binocular images. The pixel density of the display is 102 PPI. The observer was asked to sit at a distance of 0.5 meters from the display and to wear a pair of 3D polarized glasses (with transmittance of around 44%). All experiments were conducted indoor with an ambient illumination of around 200 lux.

Visual Richness The first user study evaluated the effectiveness of binocular tone mapping in terms of visual richness. It compared bioptic image pairs (both views are identical) to dichoptic image pairs (the two views are different). To fairly compare, the image of bioptic pair was generated using the "best" parameter values, instead of the default parameter values which may not be satisfactory for certain HDR input. The "best" parameters were determined as follows. For each HDR input, first randomly generate 10 LDR images with 10 sets of parameter values in the recommended parameter range of the particular tone mapping operator. Then, 8 participants were asked to choose the best (in terms of details and contrast) LDR image among them. The top-rated one was then referred to as the image of bioptic pair in the user study. The same image was also referred to as one view of the dichoptic image pair, while the other view was optimally determined by the inventive framework processor system. FIGS. 19 to 22 show four such image pairs used in the user study.

All four tone mapping operators (Durand, Fattal, Drago and Mantiuk) and eight different HDR images (32 sets of image pairs in total) were the subject of the experiments in the user study. Thirty-five participants were invited to evaluate these 32 sets of randomly displayed image pairs. In each round, a dichoptic image pair and the corresponding bioptic image pair were chosen for comparison. Note that the bioptic image pair was presented to the participants via the same 3D glasses. These two image pairs were shown in random order, i.e., the participants did not know which one was the dichoptic image pair. Each participant was then asked to select the one he/she preferred. The testers briefly explained to them that he/she could consider the visual richness and/or visual content clarity during selection. However, it was up to the participants' decision in selecting the preferred image pair. To allow the participant to better inspect the image pairs, he/she could press a button to toggle between these two image pairs during the selection. Once the participant made the decision, he/she could press a 'select' button.

TABLE 2

User study of visual richness.

| | Mean | Standard deviation | 95% confidence interval | |
|---|---|---|---|---|
| | | | Lower Bound | Upper Bound |
| Drago | 0.804 | 0.140 | 0.706 | 0.900 |
| Durand | 0.717 | 0.108 | 0.643 | 0.793 |
| Fattal | 0.753 | 0.101 | 0.683 | 0.823 |
| Mantiuk | 0.721 | 0.277 | 0.529 | 0.913 |

Table 2 shows the statistics for four tone mapping operators. It is clear that most participants preferred binocularly tone-mapped results (80.4% for Drago, 71.7% for Durand, 75.3% for Fattal and 72.1% for Mantiuk). It also shows that the binocular tone mapping can effectively preserve more visual richness than a single one, especially for the case with Drago's operator. One possible explanation is that global operators, like Drago's, are generally more constrained than the local ones, leading to either more severe loss in details or loss in contrast.

Binocular Symmetry The second user study evaluated whether the effectiveness of binocular tone mapping is symmetric to the left and right eyes. The previous visual richness experiment was again conducted on 20 participants with the same data set (four tone-mapping operators for eight different HDR images, 32 sets of image pairs in total). However, this time these 32 sets of image pairs were evaluated twice. In one of these two evaluations, the LDR image generated by the framework processor was shown to the participants' left eyes. While in the other evaluation, the generated LDR image was shown to participants' right eyes. Participants do not know which of their eyes were shown the generated LDR images.

TABLE 3

User study of binocular symmetry. L/R means the left/right eye sees the images generated by our framework.

| | | Mean | Standard deviation | 95% confidence interval | |
|---|---|---|---|---|---|
| | | | | Lower Bound | Upper Bound |
| Drago | R | 0.788 | 0.169 | 0.671 | 0.904 |
| | L | 0.825 | 0.167 | 0.709 | 0.941 |
| Durand | R | 0.706 | 0.135 | 0.613 | 0.800 |
| | L | 0.738 | 0.095 | 0.671 | 0.804 |
| Fattal | R | 0.725 | 0.136 | 0.631 | 0.819 |
| | L | 0.763 | 0.109 | 0.687 | 0.838 |
| Mantiuk | R | 0.731 | 0.225 | 0.575 | 0.887 |
| | L | 0.738 | 0.285 | 0.540 | 0.935 |

Table 3 compares the statistics from these two sets of evaluations. It is clear that, no matter which optimal image is shown to which eye, binocular tone mapping can always effectively preserve more visual richness than a single image. From the statistics, the left and right eyes are slightly asymmetric. This conforms to a prior study on ocular dominance [Ehrenstein et al. 2005].

Figure 15:
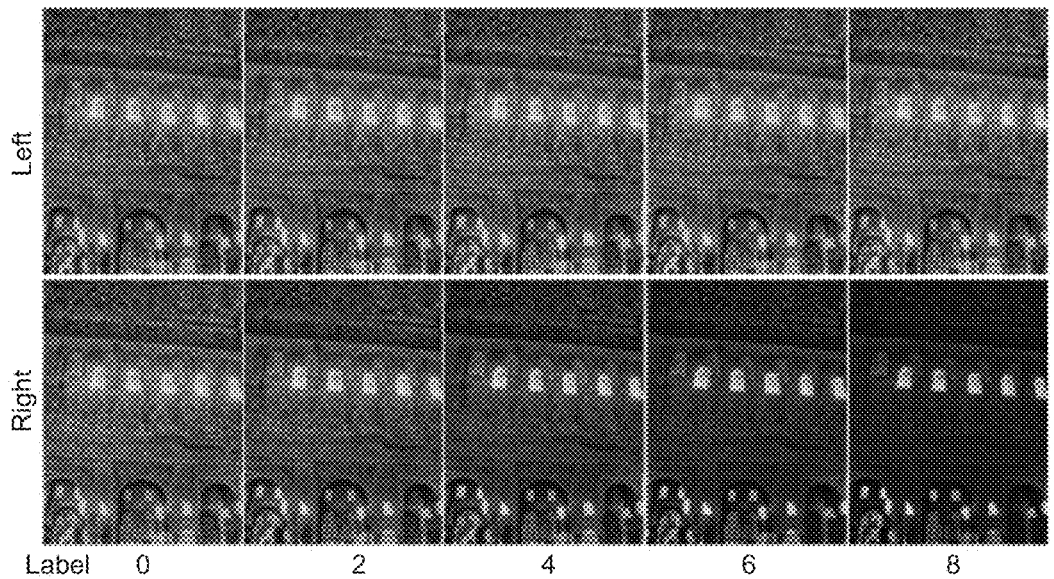
FIG. 15 is a set of pairs of images illustrating a test sequence for evaluating BVCP predictability.

Predictability of BVCP The third user study evaluated how well the BVCP predicts the discomfort limit of binocular vision. The experiment was conducted based on the classical psychophysical methodology, method of adjustment [Norton et al. 2002]. Given an HDR image and a specific tone mapping operator, a sequence of 10 LDR image pairs was presented labeled from 0 to 9. The left and right LDR images of the 0th image pair were equivalent and were tone-mapped from the source HDR using a random parameter set. As the label number increased, the left LDR image remained unchanged throughout the whole sequence, while the right LDR images were generated by linearly increasing/decreasing the values of the most influential parameter of that particular tone mapping operator. The actual increasing/decreasing step size of the parameter value did not matter, provided that the sequence contained discomfort image pairs. FIG. 15 shows one such sequence. Five HDR images (1 to 5) and all four tone mapping operators were tested, resulting in 20 sequences.

Twenty-two participants were invited to take part in the experiment. They were asked to determine the discomfort limits of all 20 sequences. For each sequence, the participants were asked to search among the 10 image pairs to find the image pair of discomfort threshold, i.e. the image pair they begin to feel discomfort, and any image pairs with lower label numbers that were still acceptable. The participants could move along the sequence by increasing or decreasing the label number. The discomfort thresholds identified by participants were then recorded. To avoid any bias, the first image pair within a sequence shown to the participants was randomly selected among the 10 pairs.

FIGS. 16A-16D shows plots of the statistics of 20 test sequences. For each sequence, the mean of human-identified discomfort threshold is indicated as a dot, while the vertical interval corresponds to 95% confidence interval of human selections. In the meantime, the BVCP processor was used to compute the predicted discomfort threshold. Each prediction was plotted as a vertical bar. Any image pair with label number above the bar triggered visual discomfort. For all test sequences, the prediction (the blue bar) was generally below the lower bound of human-identified thresholds. In other words, the BVCP process could always conservatively predict the discomfort threshold.

From the statistics, the BVCP metric does not perform equally well with all tested tone-mapping operators. Due to the current conservative design, its prediction is overly conservative for certain observers (FIG. 16D). Sometimes it also may not be well correlated with user statistics (FIG. 16C). A possible explanation to this non-correlation is the neglect of visual attention, as human observers may fail to identify those low-saliency sites while the inventive predictor treats all sites equally.

Incorporating Stereopsis

Note that the binocular fusion of color, luminance or contrast difference does not prevent the simultaneous perception of stereopsis [Steinman et al. 2000]. In other words, it is feasible to extend the inventive binocular tone mapping to incorporate the stereopsis. FIG. 17 shows one example of binocularly tone-mapped stereo image pair from a stereo HDR image pair. It presents the depth cue and, simultaneously, raises the visual richness without triggering visual discomfort. To generate this example, treat the left displaced view of the stereo HDR image pair as a standard HDR input, as before, and temporarily ignore the right displaced view. After applying the inventive binocular tone mapping on the left displaced HDR image, a left LDR image and another LDR are obtained with the optimized tone mapping parameter(s). The optimized tone mapping parameter(s) is/are applied to the right displaced HDR image. Since the framework is originally designed for single HDR input, the above approach implicitly assumes the luminance of the two HDR stereo images are similar and the disparity is small.

Limitations

The current BVCP design as implemented is very conservative. It rejects an image pair if any test of the contour fusion, contour contrast, or regional contrast fails. It rejects the image pair if there is obvious contour error at any level of the mesa pyramid. An image pair passes the BVCP test only if all pixels pass the BVCP test. All of these add up to give a conservative metric. Although the current prediction can effectively avoid visual discomfort for most individuals, it sometimes may not be very close to the user statistics (FIG. 16D). In other words, human-tolerable image pairs may sometimes be rejected. The invention does not preclude a future direction where current constraints are relaxed to give predictions closer to the user statistics.

Figure 18:
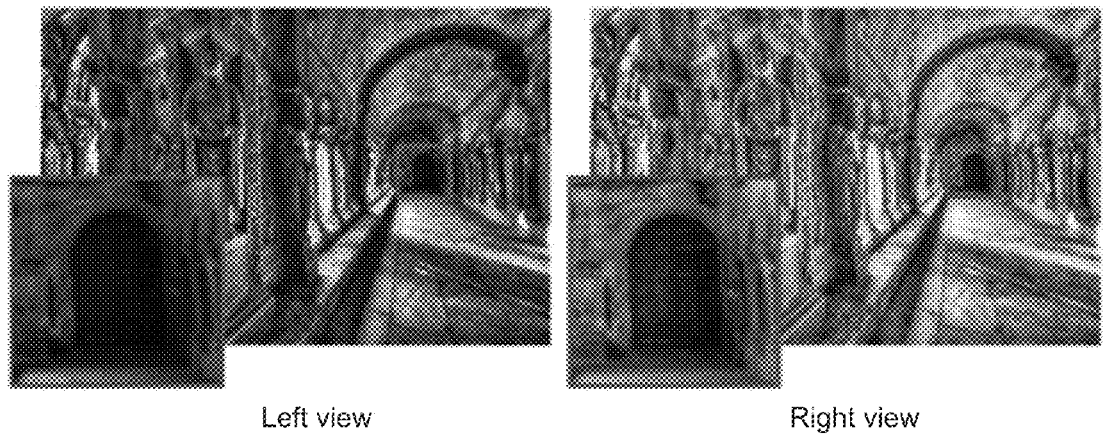
FIG. 18 is an image pair illustrating a small improvement in image richness.
Figure 19:
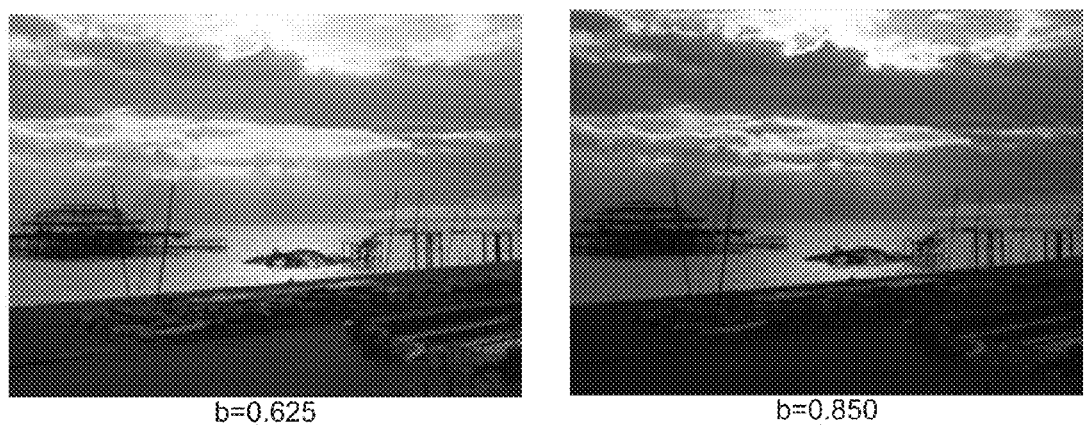
FIG. 19 is an image pair produced using Drago's operator.
Figure 22:
FIG. 22 is an image pair produced using Mantiuk's operator.

The current framework treats all pixels in the image equally. But in reality, human vision is not equally sensitive to every pixel, due to visual attention. FIG. 18 shows one such image pair. While the inventive method significantly increases the visual richness at the small door (boxed area), the attention of human observers is very likely to be attracted by another high-contrast region in the same image. This high-contrast region may, however, not be significantly improved, leading to an overall impression of insignificant improvement of visual experience.

CONCLUSION

A binocular tone mapping framework system with associated method has been described that is useful to generate a binocular LDR image pair that presents more visual richness than just a single tone-mapped image. The invention employs a novel BVCP metric that can conservatively predict the discomfort threshold. It guides generation of binocularly tone-mapped image pairs, so that visual information content of the image pair can be maximized without triggering visual discomfort. User studies demonstrate the effectiveness of the framework on a wide variety of images. Multiple tone mapping operators have been tested using the framework. Other than the current tone mapping application, the BVCP metric may also be applied in any other applications requiring binocular display. The work serves as the first attempt in graphics applications to maximize the utilization of stereo display system for binocular single vision.

The invention has been explained with respect to specific embodiments. Other embodiments are contemplated without departing from the scope of the invention. Therefore, it is not intended that the invention be limited, except as indicated by the appended claims.

What is claimed is:

1. A system for generating an image for display comprising:
    a computer processor with associated digital memory and output element, said processor being operative to employ an optimization-based binocular tone mapping framework;
    said computer processor and associated memory being configured to:
    receive in digital representation as a source a high-dynamic range image of a source high dynamic range image;
    produce a first low-dynamic range image directly from said high-dynamic range image;
    synthesize a corresponding second low-dynamic range image from said high-dynamic range image, wherein extra image space is used to enhance image content while preserving visual information, and
    present said two low-dynamic range images separately to eyes of a viewer to be processed in the brain of the viewer via human visual perception phenomenon of binocular single vision,
    said tone mapping framework being guided by a metric of a binocular viewing comfort predictor (BVCP) based upon brightness, contrast and contour differences between two views in order to assure stable formation of binocular single vision for the viewer and avoid viewing discomfort.

2. The system of claim 1 wherein said computer processor is configured to provide a first image path for said first image and a second image path for said second image, said first path and said second path being parallel.

3. The system of claim 2 wherein said second image path provides:
    an optimization processor element including a visual difference predictor and a binocular viewing comfort predictor, the binocular viewing comfort predictor being configured to establish a metric to minimize risk of said visual discomfort and the visual difference predictor being configured to maximize visual difference between said first image and said second image, subject to constraints of said binocular viewing comfort predictor.

4. The system of claim 3 wherein said first image path includes:
    a direct tone mapper configured to produce said first image from the high-definition range image.

5. The system of claim 3 wherein said optimization processor element is configured for iterative feedback to follow a gradient ascent direction based on visual difference prediction of a current low-density range image pair comprising current first image and current second image, wherein step size of said gradient ascent is reduced if the current low-density image pair cannot pass a metric test of said binocular viewing comfort predictor.

6. The system of claim 5 wherein the binocular viewing comfort predictor is configured to measure differences in terms of contour density, contrast, luminance and color.

7. The system of claim 6 wherein contour density criteria are relaxed upon failure of rivalry where contrast is small, in order to allow more visual information to be represented.

8. The system of claim 6 wherein contrast threshold is formulated as a function of luminance and spatial frequency.

9. The system of claim 1 wherein the tone mapping operator is selected from the group consisting of: bilateral filtering, gradient domain high-density range compression, adaptive logarithmic mapping, and perceptual-based contrast processing.

10. The system of claim 1 wherein the processor is configured to produce stereo image output from two single image inputs.

11. A method for generating an image for display comprising:
    receiving, in a digital memory under control of a computer processor in digital representation as a source, a high-dynamic range image of a source high dynamic range image;
    producing via said computer processor a first low-dynamic range image directly from said high-dynmaic range image;
    synthesizing via said computer processor a corresponding second low-dynamic range image from said high-dynamic range image, wherein extra image space is used to enhance image content while preserving visual information; and presenting, via a binocular display device said two low dynamic range imaged separately to eyes of a viewer to be processed in the brain of the viewer via human visual perception phenomenon of binocular single vision;

wherein a tone mapping operation is guided by a metric of a binocular viewing comfort predictor (BVCP) based upon brightness, contrast and contour differences between two views in order to assure stable formation of binocular single vision for the viewer and avoid viewing discomfort.

12. The method of claim 11 wherein said computer processor provides a first image path for said first image and a second image path for said second image, said first path and said second path being parallel.

13. The method of claim 12 wherein said second image path provides:
    establishing a metric of a binocular viewing comfort predictor in said second image path to minimize risk of said visual discomfort; and
    maximizing visual difference between said first image and said second image, subject to constraints of said metric.

14. The method of claim 13 comprising:
    producing said first image from the high-definition range image by a direct tone mapping.

15. The method of claim 14 comprising:
    synthesizing said second image by iterative feedback in a gradient ascent direction based on visual difference prediction of a current low-density range image pair comprising current first image and current second image, wherein step size of said gradient ascent is reduced if the current low-density image pair cannot pass a metric test of said binocular viewing comfort predictor.

16. The method of claim 15 wherein the metric is based on measured differences in terms of contour density, contrast, luminance and color.

17. The method of claim 15 wherein contour density criteria are relaxed upon failure of rivalry where contrast is small, in order to allow more visual information to be represented.

18. The method of claim 16 wherein contrast threshold is formulated as a function of luminance and spatial frequency.

19. The method of claim 11 wherein the tone mapping operation is selected from the group consisting of: bilateral filtering, gradient domain high-density range compression, adaptive logarithmic mapping, and perceptual-based contrast processing.

20. The method of claim 11 wherein the processor is configured to produce stereo image output from two single image inputs.

* * * * *